(12) United States Patent
Boualleg et al.

(10) Patent No.: US 10,233,090 B2
(45) Date of Patent: Mar. 19, 2019

(54) AMORPHOUS MESOPOROUS AND MACROPOROUS ALUMINA WITH AN OPTIMIZED PORE DISTRIBUTION, AND PROCESS FOR ITS PREPARATION

(71) Applicant: IFP Energies Nouvelles, Rueil-Malmaison (FR)

(72) Inventors: Malika Boualleg, Villeurbanne (FR); Celine Bouvry, Rueil Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/318,017

(22) PCT Filed: Jun. 9, 2015

(86) PCT No.: PCT/EP2015/062824
§ 371 (c)(1),
(2) Date: Dec. 12, 2016

(87) PCT Pub. No.: WO2015/189198
PCT Pub. Date: Dec. 17, 2015

(65) Prior Publication Data
US 2017/0129781 A1 May 11, 2017

(30) Foreign Application Priority Data
Jun. 13, 2014 (FR) .................................. 14 55411

(51) Int. Cl.
| | | |
|---|---|---|
| *C01F 7/34* | (2006.01) | |
| *B01J 37/03* | (2006.01) | |
| *B01J 21/04* | (2006.01) | |
| *B01J 35/10* | (2006.01) | |
| *B01J 37/00* | (2006.01) | |
| *C01F 7/44* | (2006.01) | |
| *B01J 20/08* | (2006.01) | |
| *B01J 20/28* | (2006.01) | |
| *B01J 20/30* | (2006.01) | |
| *B01J 37/08* | (2006.01) | |

(52) U.S. Cl.
CPC .................. *C01F 7/34* (2013.01); *B01J 20/08* (2013.01); *B01J 20/28061* (2013.01); *B01J 20/28073* (2013.01); *B01J 20/28083* (2013.01); *B01J 20/28085* (2013.01); *B01J 20/28092* (2013.01); *B01J 20/3007* (2013.01); *B01J 20/3078* (2013.01); *B01J 20/3085* (2013.01); *B01J 21/04* (2013.01); *B01J 35/109* (2013.01); *B01J 35/1019* (2013.01); *B01J 35/1042* (2013.01); *B01J 35/1061* (2013.01); *B01J 35/1071* (2013.01); *B01J 35/1076* (2013.01); *B01J 37/0009* (2013.01); *B01J 37/009* (2013.01); *B01J 37/0063* (2013.01); *B01J 37/036* (2013.01); *B01J 37/08* (2013.01); *C01F 7/441* (2013.01); *C01P 2004/53* (2013.01); *C01P 2006/12* (2013.01); *C01P 2006/14* (2013.01); *C01P 2006/16* (2013.01)

(58) Field of Classification Search
CPC .................. B01J 20/08; B01J 20/28061; B01J 20/28073; B01J 20/28083; B01J 20/28085; B01J 20/28092; B01J 20/3007; B01J 20/3078; B01J 20/3085; B01J 21/04; B01J 35/1019; B01J 35/1042; B01J 35/1061; B01J 35/1071; B01J 35/1076; B01J 35/109; B01J 37/0009; B01J 37/036; B01J 37/08; C01F 7/441; C01F 7/34
See application file for complete search history.

(56) References Cited

U.S. PATENT DOCUMENTS

| | | | |
|---|---|---|---|
| 4,301,037 A | 11/1981 | Sanchez et al. | |
| 6,589,908 B1 * | 7/2003 | Ginestra | B01J 21/04 423/625 |

(Continued)

FOREIGN PATENT DOCUMENTS

| | | |
|---|---|---|
| GB | 2073162 A | 10/1981 |
| WO | 2005/028106 A1 | 3/2005 |

OTHER PUBLICATIONS

International Search Report dated Sep. 25, 2015 issued in corresponding PCT/EP2015/062824 application (3 pages).

(Continued)

*Primary Examiner* — James A Fiorito
(74) *Attorney, Agent, or Firm* — Millen, White, Zelano and Branigan, P.C.

(57) ABSTRACT

A process for the preparation of an amorphous mesoporous and macroporous alumina: at least once dissolving an acidic precursor of aluminium, adjusting pH by adding at least one basic precursor to the suspension obtained in a), co-precipitation of the suspension obtained from b) by adding at least one basic precursor and at least one acidic precursor to the suspension, filtration, drying, shaping and heat treatment.

An amorphous mesoporous and macroporous alumina with bimodal pore structure:

a specific surface area $S_{BET}$ more than 100 m²/g;

a median mesopore diameter, by volume determined by mercury intrusion porosimetry, 18 nm or more;

a median macropore diameter, by volume determined by mercury intrusion porosimetry, 100 to 1200 nm, limits included;

a mesopore volume, as measured by mercury intrusion porosimetry, 0.7 mL/g or more;

and a total pore volume, as measured by mercury porosimetry, 0.8 mL/g or more.

7 Claims, No Drawings

(56) References Cited

U.S. PATENT DOCUMENTS

| | | |
|---|---|---|
| 7,790,652 B2 | 9/2010 | Ackerman et al. |
| 8,969,239 B2 | 3/2015 | Ginestra et al. |
| 2005/0101480 A1 | 5/2005 | Ackerman et al. |
| 2010/0276339 A1 | 11/2010 | Ginestra et al. |

OTHER PUBLICATIONS

M. Liu et al., "Facile Synthesis and Characterization of Macro-Mesoporous—Al2O3", Colloids and Surfaces A: Physicachemical and Engineering Aspects, vol. 371, No. 1-3 (2010) pp. 126-130.
G-C Li et al., "Meso/Macroporous—Al2O3 Fabricated by Thermal Decomposition of Nanorods Ammonium Aluminium Carbonate Hydroxide", Materials Research Bulletin, vol. 47 No. 4 (2012) pp. 1073-1079.

* cited by examiner

AMORPHOUS MESOPOROUS AND MACROPOROUS ALUMINA WITH AN OPTIMIZED PORE DISTRIBUTION, AND PROCESS FOR ITS PREPARATION

FIELD OF THE INVENTION

The present invention relates to the preparation of a shaped amorphous mesoporous and macroporous alumina starting from a specific alumina gel, said alumina gel being obtained by a process comprising a step for dissolving an acidic precursor of alumina, a step for adjusting the pH of the suspension by adding a basic precursor, and a step for co-precipitation of an acidic precursor and a basic precursor, at least one of the two containing alumina.

In particular, the present invention relates to an amorphous mesoporous and macroporous alumina having a specific pore distribution, in particular an increase in the mesopore volume, associated with a mean pore size of 18 nm or more and an increased macropore volume.

Because of its interesting properties, in particular in terms of pore distribution, the alumina of the invention may be used as a support for catalysts in all refining processes as well as an adsorbent.

PRIOR ART

Many patents describe the preparation of aluminas. Processes for the preparation of alumina gels by co-precipitation are known in the prior art. Thus, patent U.S. Pat. No. 6,589,908 describes, for example, a process for the preparation of an alumina characterized by an absence of macropores, less than 5% of the total pore volume being constituted by pores with a diameter of more than 35 nm, a high pore volume of more than 0.8 mL/g, and a bimodal pore distribution in which the two modes are separated by 1 to 20 nm and the primary pore mode being larger than the mean pore diameter.

In this regard, the mode described uses two steps for precipitation of alumina precursors under well-controlled temperature, pH and flow rate conditions. The first step is operated at a temperature in the range 25° C. to 60° C., and a pH in the range 3 to 10. The suspension is then heated to a temperature in the range 50° C. to 90° C. Reactants are again added to the suspension, which is then washed, dried, shaped and calcined in order to form a catalyst support.

Patent application WO 2004/052534 A1 also describes two catalysts mixed with supports having different pore characteristics, the first catalyst having more than half of the pore volume in pores with a diameter of more than 20 nm, 10% to 30% of the pore volume being contained in pores with a diameter of more than 200 nm, the total pore volume being more than 0.55 mL/g, the second having more than 75% of the pore volume contained in pores with a diameter in the range 10 to 120 nm, and less than 2% in pores with a diameter of more than 400 nm.

The preparation process described for the preparation of those catalysts employs a step for co-precipitation of aluminium sulphate with sodium aluminate, the gel obtained then being dried, extruded and calcined. It is possible to add silica during or after the co-precipitation.

In a reactor, in the presence of water at a temperature of 60-75° C., a base (NaAlOO, aluminium hydroxide or NaOH) and an acid (AlSO$_4$ or AlNO$_3$) are added, with stirring, at a pH in the range 7 to 9.9. The mixture is allowed to mature for a period in the range 30 min to 1 h30. The mixture then undergoes the steps of mixing, extrusion, drying (200° C.) in air, and heat treatment. Adjusting the shaping means that the characteristics of a support can be obtained.

However, the preparation embodiments described in the prior art cannot be used to obtain a bimodal, macroporous and esoporous pore distribution targeted on mesopores with a large size. Furthermore, an increase in the porosity is often to the detriment of the specific surface area and the mechanical strength.

Surprisingly, the Applicant has discovered that a process for the preparation of a specific alumina gel employing a step for dissolving an acidic precursor of aluminium, a step for adjusting the pH using a basic precursor and a step for co-precipitation of at least one acidic precursor and at least one basic precursor, at least one of the two precursors comprising aluminium, results in a mesoporous and macroporous alumina with a large total pore volume, a high median mesopore diameter, a high proportion of large diameter macropores and a specific surface area and mechanical strength which are maintained despite the increase in the porosity.

ASPECTS OF THE INVENTION

In one aspect, the present invention provides an alumina with a bimodal pore distribution: mesoporous and macroporous, with a high mesopore volume and a high total pore volume, together with a median mesopore diameter of 18 nm or more and a median macropore diameter in the range 100 to 1200 nm, limits included.

In a further aspect, the present invention pertains to a process for the preparation of said alumina, said process comprising at least the following steps:
 a) dissolving an acidic precursor of aluminium;
 b) adjusting the pH using a basic precursor;
 c) co-precipitating an acidic precursor and a basic precursor, at least one of the two containing aluminium;
 d) filtration;
 e) drying;
 f) shaping;
 g) heat treatment.

DESCRIPTION OF THE INVENTION

Summary of the Invention

The invention concerns a process for the preparation of an amorphous mesoporous and macroporous alumina, said process comprising at least the following steps:
 a) a step for dissolving an acidic precursor of aluminium selected from aluminium sulphate, aluminium chloride and aluminium nitrate in water, at a temperature in the range 20° C. to 90° C., at a pH in the range 0.5 to 5, for a period in the range 2 to 60 minutes;
 b) a step for adjusting the pH by adding, to the suspension obtained in step a), at least one basic precursor selected from sodium aluminate, potassium aluminate, ammonia, sodium hydroxide and potassium hydroxide, at a temperature in the range 20° C. to 90° C., and at a pH in the range 7 to 10, for a period in the range 5 to 30 minutes;
 c) a step for co-precipitation of the suspension obtained at the end of step b) by adding to the suspension at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, at least one of the basic or acidic precursors comprising aluminium, the relative flow rate of the acidic and basic precursors being selected so as to obtain a pH in the range 7 to 10 in the reaction medium and the flow rate of the acidic and basic precursor or precursors containing aluminium being adjusted so as to obtain a final concentration of alumina in the suspension in the range 10 to 38 g/L;

d) a step for filtration of the suspension obtained at the end of the co-precipitation step c) in order to obtain an alumina gel;

e) a step for drying said alumina gel obtained in step d) in order to obtain a powder;

f) a step for shaping the powder obtained at the end of step e) in order to obtain a green material;

g) a step for heat treatment of the green material obtained at the end of step f) at a temperature in the range 500° C. to 1000° C., in the presence or otherwise of a stream of air containing up to 60% by volume of water.

The concentration of alumina in the suspension of alumina gel obtained in step c) is advantageously in the range 13 to 35 g/L, preferably in the range 15 to 33 g/L.

Preferably, the acidic precursor is aluminium sulphate.

Preferably, the basic precursor is sodium aluminate.

Preferably, in steps a), b), c), the aqueous reaction medium is water and said steps are operated with stirring, in the absence of an organic additive.

Preferably, the acidic precursor of step a) is introduced in a quantity corresponding to 0.5% to 4% by weight of the total weight of the alumina formed at the end of step c).

The invention also concerns an amorphous mesoporous and macroporous alumina with a bimodal pore structure having:

a specific surface area $S_{BET}$ of more than 100 m²/g;

a median mesopore diameter, by volume determined by mercury intrusion porosimetry, of 18 nm or more;

a median macropore diameter, by volume determined by mercury intrusion porosimetry, in the range 100 to 1200 nm, limits included;

a mesopore volume, as measured by mercury intrusion porosimetry, of 0.7 mL/g or more;

and a total pore volume, as measured by mercury porosimetry, of 0.8 mL/g or more.

Preferably, the alumina has a median mesopore diameter, by volume determined by mercury intrusion porosimetry, in the range 18 to 25 nm, limits included.

Preferably, the alumina has a median mesopore diameter, by volume determined by mercury intrusion porosimetry, in the range 19 to 23 nm, limits included.

Preferably, the macropore volume is in the range 10% to 35% of the total pore volume.

Advantageously, the amorphous mesoporous and macroporous alumina does not have micropores.

Finally, the invention concerns an amorphous mesoporous and macroporous alumina which is susceptible of being obtained by the preparation process in accordance with the invention.

Detailed Description of the Invention

Terminology and Characterization Techniques

Throughout the remainder of the text, the dispersibility is defined as the weight of solid or peptised alumina gel which cannot be dispersed by centrifuging in a polypropylene tube at 3600G for 3 min.

The alumina of the present invention also has a specific pore distribution, wherein the macroporous and mesopore volumes are measured by mercury intrusion and the micropore volume is measured by nitrogen adsorption.

The term "macropores" means pores with an opening of more than 50 nm.

The term "mesopores" means pores with an opening in the range 2 nm to 50 nm, limits included.

The term "micropores" means pores with an opening of less than 2 nm.

In the following disclosure of the invention, the term "specific surface area" means the BET specific surface area determined by nitrogen adsorption in accordance with ASTM D 3663-78 based on the BRUNAUER-EMMETT-TELLER method described in the periodical "The Journal of American Society", 60, 309, (1938).

In the following disclosure of the invention, the term "total pore volume" for the alumina means the volume measured by mercury intrusion porosimetry in accordance with the standard ASTM D 4284-83 at a maximum pressure of 4000 bar, using a surface tension of 484 dyne/cm and a contact angle of 140°. The wetting angle was taken to be equal to 1400, following the recommendations in the work "Techniques de l'ingénieur, traité analyse et caractérisation" [Engineering Techniques: analysis and characterization], P 1050-5, authors: Jean Charpin and Bernard Rasneur.

In order to obtain better precision, the value of the total pore volume in mL/g given in the text below corresponds to the value for the total mercury volume (total pore volume measured by mercury intrusion porosimetry) in mL/g measured for the sample less the value of the mercury volume in mL/g measured for the same sample for a pressure corresponding to 30 psi (approximately 0.2 MPa).

The volume of the macropores and mesopores is measured by mercury intrusion porosimetry in accordance with the standard ASTM D 4284-83 at a maximum pressure of 4000 bar, using a surface tension of 484 dyne/cm and a contact angle of 140°.

The value from which the mercury fills all of the intergranular voids is fixed at 0.2 MPa and it is assumed that beyond this, the mercury penetrates into the pores of the alumina.

The macropore volume of the alumina is defined as being the cumulative volume of mercury introduced at a pressure in the range 0.2 MPa to 30 MPa, corresponding to the volume contained in pores with an apparent diameter of more than 50 nm.

The mesopore volume of the alumina determined by mercury intrusion porosimetry is defined as being the cumulative volume of mercury introduced at a pressure in the range 30 MPa to 400 MPa, corresponding to the volume contained in pores with an apparent diameter in the range 2 to 50 nm.

The volume of the micropores is measured by nitrogen porosimetry. The quantitative analysis of the microporosity is carried out using the "t" method (Lippens-De Boer method, 1965) which corresponds to a transform of the starting adsorption isotherm, as described in the work "Adsorption by powders and porous solids. Principles, methodology and applications" by F. Rouquérol, J. Rouquérol and K. Sing, Academic Press, 1999.

The median mesopore diameter ($D_{pmeso}$, in nm) is also defined as being a diameter at which all of the pores with a size smaller than this diameter constitute 50% of the total mesopore volume, measured by mercury intrusion porosimetry.

The median macroporous diameter ($D_{pmacro}$, in nm) is also defined as being a diameter at which all of the pores with a size smaller than this diameter constitute 50% of the total macropore volume, measured by mercury intrusion porosimetry.

The pore distribution measured by nitrogen adsorption is determined using the Barrett-Joyner-Halenda (BJH) model. The BJH-model nitrogen adsorption-desorption isotherm is described in the periodical "The Journal of American Society", 73, 373, (1951) by E. P. Barrett, L. G. Joyner and P. P. Halenda.

Process for Preparing the Alumina of the Invention

The alumina of the invention is obtained by filtration, drying, shaping and calcining of a specific alumina gel. The preparation of said alumina gel comprises three successive steps: a) a step for dissolving an acidic precursor of alumina, b) a step for adjusting the pH of the suspension using a basic precursor, and c) a step for co-precipitation of at least one acidic precursor and at least one basic precursor, at least one of the two containing aluminium. At the end of the synthesis proper of the alumina gel, i.e. at the end of step c), the final alumina concentration in the suspension must be in the range 10 to 38 g/L, preferably in the range 13 to 35 g/L and more preferably in the range 15 to 33 g/L.

a) Dissolution Step

Step a) is a step for dissolving an acidic precursor of aluminium in water, carried out at a temperature in the range 20° C. to 80° C., preferably in the range 20° C. to 75° C. and more preferably in the range 30° C. to 70° C. The acidic precursor of aluminium is selected from aluminium sulphate, aluminium chloride and aluminium nitrate, preferably aluminium sulphate. The pH of the suspension obtained is in the range 0.5 to 5, preferably in the range 1 to 4, more preferably in the range 1.5 to 3.5. This step advantageously contributes to a quantity of alumina introduced with respect to the final alumina in the range 0.5% to 4%, preferably in the range 1% to 3%, highly preferably in the range 1.5% to 2.5% by weight. The suspension is stirred for a period in the range 2 to 60 minutes, preferably 5 to 30 minutes.

b) pH Adjustment Step

The step for adjusting the pH, b), consists of adding to the suspension obtained in step a) at least one basic precursor selected from sodium aluminate, potassium aluminate, ammonia, sodium hydroxide and potassium hydroxide.

Preferably, the basic precursor is a precursor of alumina selected from sodium aluminate and potassium aluminate. Highly preferably, the basic precursor is sodium aluminate.

Step b) is carried out at a temperature in the range 20° C. to 90° C., preferably in the range 20° C. to 80° C. and more preferably in the range 30° C. to 70° C. and at a pH in the range 7 to 10, preferably in the range 8 to 10, more preferably in the range 8.5 to 10 and highly preferably in the range 8.7 to 9.9. The duration of the pH adjustment step b) is in the range 5 to 30 minutes, preferably in the range 8 to 25 minutes, and highly preferably in the range 10 to 20 minutes.

c) Co-Precipitation Step ($2^{nd}$ Precipitation)

Step c) is a step for precipitation by bringing at least one basic precursor selected from sodium aluminate, potassium aluminate, ammonia, sodium hydroxide and potassium hydroxide into contact in an aqueous reaction medium with at least one basic or acidic precursor selected from aluminium sulphate, aluminium chloride, aluminium nitrate, sulphuric acid, hydrochloric acid and nitric acid, at least one of the basic or acidic precursors comprising aluminium, said precursors being selected so as to be identical or otherwise to the precursors introduced in steps a) and b). The relative flow rate of the acidic and basic precursors is selected so as to obtain a pH for the reaction medium in the range 7 to 10 and the flow rate of the acidic and basic precursors containing aluminium is adjusted so as to obtain a final alumina concentration in the suspension in the range 10 to 38 g/L, preferably in the range 13 to 35 g/L and more preferably in the range 15 to 33 g/L.

Preferably, the co-precipitation step is carried out at a temperature in the range 20° C. to 90° C., more preferably in the range 30° C. to 70° C.

The precipitation step c) is carried out at a pH in the range 7 to 10, preferably in the range 8 to 10, more preferably in the range 8.5 to 10 and highly preferably in the range 8.7 to 9.9.

The co-precipitation step c) is carried out for a period in the range 1 to 60 minutes, preferably 5 to 45 minutes.

Preferably, said steps a), b) and c) are carried out in the absence of organic additive.

Preferably, the synthesis of the alumina gel (steps a), b) and c)) is operated with stirring.

In steps a), b) and c), the flow rates of the basic and acidic precursors, whether or not they contain aluminium, are determined as a function of the pH to be obtained in each step. The base/acid weight ratios are in particular set by a graph of the neutralization of the base by the acid. A graph of this type can readily be obtained by the skilled person.

d) Filtration Step

Preferably, the process for the preparation of the alumina of the invention also comprises a step for filtration of the suspension obtained at the end of step c).

Said filtration step is carried out using methods known to the skilled person.

Said filtration step is advantageously followed by at least one washing step, with an aqueous solution, preferably with water and preferably by one to three washing steps, with a quantity of water equal to the quantity of filtered precipitate.

e) Drying Step

In accordance with the invention, the alumina gel obtained at the end of precipitation step c) followed by a filtration step d) is dried in a drying step e) in order to obtain a powder, said drying step advantageously being carried out by drying at a temperature of 120° C. or more or by spray drying or by any other drying technique known to the skilled person.

In the case in which said drying step e) is carried out by drying at a temperature of 120° C. or more, said drying step e) may advantageously be carried out in a sealed and ventilated oven. Preferably, said drying step is operated at a temperature in the range 120° C. to 300° C., highly preferably at a temperature in the range 150° C. to 250° C.

In the case in which said drying step e) is carried out by spray drying, the cake obtained at the end of the second precipitation step, followed by a filtration step, is taken up into suspension. Said suspension is then atomized into fine droplets, in a vertical cylindrical chamber in contact with a stream of hot air in order to evaporate the water in accordance with a principle which is well known to the skilled person. The powder obtained is entrained by the flow of heat into a cyclone or a sleeve filter which will separate the air from the powder.

Preferably, in the case in which said drying step e) is carried out by spray drying, the spray drying is carried out in accordance with the operating protocol described in the publication by Asep Bayu Dani Nandiyanto, Kikuo Okuyama, Advanced Powder Technology, 22, 1-19, 2011.

f) Shaping Step

In accordance with the invention, the powder obtained at the end of drying step e) is shaped in a step f) in order to obtain a green material.

The term "green material" means the shaped material which has not undergone heat treatment steps.

Preferably, said shaping step f) is carried out by mixing-extrusion, by granulation, by the oil drop technique, or by pelletization.

Highly preferably, said shaping step f) is carried out by mixing-extrusion.

Shaping is advantageously carried out with an acid content (total, expressed with respect to the dry alumina) in the range 0 to 4% and preferably in the range 0.5% to 1.5%, and a degree of neutralization in the range 0 to 200% and preferably in the range 0 to 40%. The acidic and basic losses on ignition are advantageously in the range 60% to 70%.

g) Heat Treatment Step

In accordance with the invention, the green material obtained at the end of shaping step f) then undergoes a step g) for heat treatment at a temperature in the range 500° C. to 1000° C., for a period which is advantageously in the range 2 to 10 h, in the presence or otherwise of a stream of air containing up to 60% by volume of water.

Preferably, said heat treatment is carried out in the presence of a stream of air containing water.

Preferably, said heat treatment step g) is operated at a temperature in the range 540° C. to 850° C.

Preferably, said heat treatment step g) is operated for a period in the range 2 h to 10 h.

Said heat treatment step g) can be used to transform boehmite into the final alumina.

The heat treatment step may be preceded by a drying step at a temperature in the range 50° C. to 120° C., using any technique which is familiar to the skilled person.

Characteristics of Amorphous Mesoporous and Macroporous Alumina Obtained

The pore distribution of the alumina obtained was characterized by mercury intrusion porosimetry in accordance with the standard ASTM D 4284-83 at a maximum pressure of 4000 bar, using a surface tension of 484 dyne/cm and a contact angle of 140°.

The absence of micropores was verified by nitrogen porosimetry.

The preparation process of the invention can be used to obtain an amorphous mesoporous and macroporous alumina with a high median mesopore diameter, determined from a graph of the pore distribution by volume by mercury intrusion porosimetry.

The alumina of the present invention advantageously has a total pore volume (TPV), as measured by mercury intrusion porosimetry, of at least 0.80 mL/g, preferably at least 0.90 mL/g, highly preferably at least 0.95 mL/g.

The alumina of the invention advantageously has a macropore volume. $V_{50nm}$, defined as the volume of pores with a diameter of more than 50 nm, as measured by mercury intrusion porosimetry, in the range 10% to 35% of the total pore volume and preferably in the range 15% to 30% of the total pore volume. In a highly preferable embodiment, the macropore volume represents in the range 20% to 30% of the total pore volume.

The alumina of the present invention advantageously has a mesopore volume, i.e. contained in pores with a diameter in the range 2 to 50 nm, limits included, as measured by mercury intrusion porosimetry, of at least 0.70 mL/g, preferably at least 0.75 mL/g.

The median mesopore diameter (here termed $D_{pmeso}$) is advantageously in the range 18 nm to 25 nm, limits included, preferably in the range 19 to 23 nm, limits included, and highly preferably in the range 20 to 23 nm, limits included.

The median macropore diameter (here termed $D_{pmacro}$) is in the range 100 nm to 1200 nm, preferably in the range 110 nm to 1000 nm, highly preferably in the range 250 to 500 nm, limits included.

The alumina of the present invention has a BET specific surface area (SSA) of at least 100 m²/g, preferably at least 110 m²/g and still more preferably in the range 120 to 160 m²/g.

The preparation mode of the present invention has the particular advantage of resulting in an alumina with a mechanical strength which is entirely satisfactory having regard to the pore volumes which characterize it, said strength being illustrated by the value of the average crushing strength, EGG, preferably of at least 0.5 daN/mm, highly preferably of at least 0.8 daN/mm.

Highly preferably, the textural characteristics of a mesopomus and macroporous alumina obtained from a gel prepared in accordance with the particular embodiment described above are as follows:
- a total mesopore volume, as determined by mercury porosimetry intrusion, in the range 0.75 to 0.85 mL/g, limits included;
- a total macropore volume, as determined by mercury intrusion porosimetry, in the range 0.15 to 0.25 mL/g, limits included;
- a median mesopore diameter by volume, as determined by mercury intrusion porosimetry, in the range 18 to 25 nm, limits included;
- a median macropore diameter by volume, as determined by mercury intrusion porosimetry, in the range 100 to 1200 nm, limits included;
- a total pore volume in the range 0.90 to 1.05 mL/g, limits included;
- a specific surface area $S_{BET}$ in the range 110 to 200 m²/g, limits included;
- a pore distribution, expressed as the percentage of the total pore volume (TPV), as follows:
  0 to 10% of TPV is occupied by pores with a diameter strictly less than 10 nm;
  0 to 35% of TPV is occupied by pores with a diameter in the range 10 to 20 nm, upper limit excluded;
  10% to 70% of TPV is occupied by pores with a diameter in the range 20 to 50 nm, upper limit excluded;
  10% to 90% of TPV is occupied by pores with a diameter of 50 nm or more.

The invention will now be illustrated in the following examples which are not in any way limiting in nature.

EXAMPLES

Example 1 (in Accordance with the Invention)

Preparation of an Alumina A1 in Accordance with the Invention

The aqueous sodium aluminate and aluminium sulphate precursor solutions were prepared from a stock solution.

A laboratory reactor with a capacity sensor of approximately 7000 mL was used.

The synthesis was carried out at 70° C. and with stirring. The foot of water was 1679 mL.

Alumina A1

5 L of a solution with a fixed concentration of 27 g/L of alumina in the final suspension was prepared; its contribution to the first step was 2.1% by weight of the total alumina.

Dissolving Step a):

70 mL of aluminium sulphate was introduced all at once into the reactor containing the foothead of water. The change in the pH, which remained in the range 2.5 to 3, was monitored for 10 min. This step contributed to introducing 2.1% by weight of alumina with respect to the total mass of alumina formed at the end of synthesis of the gel.

Step b), Adjustment of pH:

After the step for dissolving the aluminium sulphate, approximately 70 mL of sodium aluminate was then slowly added. The aim was to obtain a pH in the range 7 to 10 over a period of 5 to 15 min.

Co-Precipitation Step c):

The following were added to the suspension obtained in step b) over 30 min:

1020 mL of aluminium sulphate, i.e. a flow rate of 34 mL/min, 1020 mL of sodium aluminate, i.e. a flow rate of 34 mL/min, 1150 mL of distilled water, i.e. a flow rate of 38.3 mL/min.

The pH of the co-precipitation was kept between 7 and 10 by controlling the speed of the sodium aluminate pump as a priority.

At the end of the synthesis, the suspension was filtered and washed several times.

The cake was over-dried in an oven for a minimum overnight period at 200° C. The powder which was to be shaped was obtained.

The principal characteristics of the gel obtained and used for shaping are summarized in Table 1.

TABLE 1

Characteristics of gel used for preparation of alumina

| Phase detected in XRD | Loss on ignition (% m/m) | S content (ppm) | Na content (ppm) |
|---|---|---|---|
| Boehmite | 20.7 | 350 | 60 |

Shaping was carried out on a Brabender type mixer with an acid content (total, expressed with respect to the dry alumina) of 1%, a degree of neutralization of 20% and respective acidic and basic losses on ignition of 62% and 64%.

Extrusion was carried out through a plug extruder (rate of extrusion 50 cm/min and three-lobed die with a diameter of 2.1 mm).

After extrusion, the rods were dried overnight at 80° C. and calcined for 2 h at 800° C. in a stream of moist air in a tube furnace (HSV=1 L/h/g with 30% water).

Example 2 (in Accordance with the Invention)

Two aluminas A2 and A3 were prepared in a manner identical to that prepared in Example 1, but starting from two suspensions of alumina gel with respective concentrations of 15 g/L of final alumina concentration and 30 g/L of final alumina concentration.

Only the final alumina concentration of the gel was varied.

Alumina A2

5 L of a solution was prepared with a fixed concentration of 15 g/L of final alumina and with a contribution to the first step of 2.1% by weight of the total alumina.

Dissolving Step a):

39 mL of aluminium sulphate was introduced all at once into the reactor containing the foothead of water. The change in the pH, which remained in the range 2.5 to 3, was monitored for 10 min. This step contributed to introducing 2.1% by weight of alumina with respect to the total mass of alumina formed at the end of synthesis of the gel.

Step b), Adjustment of pH:

After the step for dissolving the aluminium sulphate, approximately 40 mL of sodium aluminate was then slowly added. The aim was to obtain a pH in the range 7 to 10 over a period of 5 to 15 min.

Co-Precipitation Step c):

The following were added to the suspension obtained in step b) over 30 min:

567 mL of aluminium sulphate, i.e. a flow rate of 20 mL/min, 567 mL of sodium aluminate, i.e. a flow rate of 19 mL/min, 639 mL of distilled water, i.e. a flow rate of 22 mL/min.

Alumina A3

5 L of a solution was prepared with a fixed concentration of 30 g/L of final alumina and with a contribution to the first step of 2.1% by weight of the total alumina.

Dissolving Step a):

77 mL of aluminium sulphate was introduced all at once into the reactor containing the foot of water. The change in the pH, which remained in the range 2.5 to 3, was monitored for 10 min. This step contributed to introducing 2.1% by weight of alumina with respect to the total mass of alumina formed at the end of synthesis of the gel.

Step b), Adjustment of pH:

After the step for dissolving the aluminium sulphate, approximately 78 mL of sodium aluminate was then slowly added. The aim was to obtain a pH in the range 7 to 10 over a period of 5 to 15 min.

Co-precipitation Step c):

The following were added to the suspension obtained in step b) over 30 min:

1135 mL of aluminium sulphate, i.e. a flow rate of 38 mL/min, 1135 mL of sodium aluminate, i.e. a flow rate of 39 mL/min, 180 mL of distilled water, i.e. a flow rate of 43 mL/min.

The pore characteristics of aluminas A1, A2 and A3 obtained are recorded in Table 2 as a function of the concentration of alumina in the suspension of gel obtained at the end of step c).

TABLE 2

Pore characteristics of aluminas A1, A2 et A3 obtained as a function of the concentration of alumina in the final suspension of gel

| Alumina | Final [Al$_2$O$_3$] of gel | $V_{meso}$ (mL/g) | $V_{macro}$ (mL/g) | $D_{pmeso}$ (nm) | $D_{pmacro}$ (nm) | TPV (mL) | $S_{BET}$ (m$^2$/g) |
|---|---|---|---|---|---|---|---|
| A2 | 15 g/L | 0.77 | 0.26 | 22.7 | 250 | 1.03 | 119 |
| A1 | 27 g/L | 0.83 | 0.21 | 20.8 | 250 | 1.04 | 130 |
| A3 | 30 g/L | 0.78 | 0.24 | 20.2 | 302 | 1.02 | 124 |

Example 3 (Comparative)

Preparation of Three Aluminas C1, C2 and C3, not in Accordance with the Invention Three aluminas C1, C2 and C3 were prepared in a manner identical to that prepared in Example 1, but starting from three suspensions of alumina gels with respective concentrations of 40 g/L of final alumina concentration, 60 g/L of final alumina concentration and 8 g/L of final alumina concentration.

Only the final alumina concentration of the gel was varied.

Alumina C1

5 L of a solution was prepared with a fixed concentration of 40 g/L of final alumina and with a contribution to the first step of 2.1% by weight of the total weight of the alumina.

Dissolving Step a):

103 mL of aluminium sulphate was introduced all at once into the reactor containing the foothead of water. The change in the pH, which remained in the range 2.5 to 3, was monitored for 10 min. This step contributed to introducing 2.1% by weight of alumina with respect to the total mass of alumina formed at the end of synthesis of the gel.

Step b), Adjustment of pH:

After the step for dissolving the aluminium sulphate, approximately 103 mL of sodium aluminate was then slowly added. The aim was to obtain a pH in the range 7 to 10 over a period of 5 to 15 min.

Co-precipitation Step c):

The following were added to the suspension obtained in step b) over 30 min:

1515 mL of aluminium sulphate, i.e. a flow rate of 51 mL/min, 1515 mL of sodium aluminate, i.e. a flow rate of 51 mL/min, 1710 mL of distilled water, i.e. a flow rate of 58 mL/min.

Alumina C2

5 L of a solution was prepared with a fixed concentration of 60 g/L of final alumina and with a contribution to the first step of 2.1% by weight of the total weight of the alumina.

2270 mL of aluminium sulphate, i.e. a flow rate of 76 mL/min, 2270 mL of sodium aluminate, i.e. a flow rate of 76 mL/min, 2600 mL of distilled water, i.e. a flow rate of 85.5 mL/min.

Alumina C3

5 L of a solution was prepared with a fixed concentration of 8 g/L of final alumina and with a contribution to the first step of 2.1% by weight of the total alumina.

Dissolving Step a):

21 mL of aluminium sulphate was introduced all at once into the reactor containing the foot of water. The change in the pH, which remained in the range 2.5 to 3, was monitored for 10 min. This step contributed to introducing 2.1% by weight of alumina with respect to the total mass of alumina formed at the end of synthesis of the gel.

Step b), Adjustment of pH:

After the step for dissolving the aluminium sulphate, approximately 21 mL of sodium aluminate was then slowly added. The aim was to obtain a pH in the range 7 to 10 over a period of 5 to 15 min.

Co-precipitation Step c):

The following were added to the suspension obtained in step b) over 30 min:

302 mL of aluminium sulphate, i.e. a flow rate of 10 mL/min, 302 mL of sodium aluminate, i.e. a flow rate of 10 mL/min, 341 mL of distilled water, i.e. a flow rate of 11.3 mL/min.

TABLE 3

Pore characteristics of aluminas A1 (in accordance with the invention), C1, C2 and C3 (not in accordance with the invention) obtained as a function of the concentration of alumina in the final gel suspension

| | Final [Al2O3] of gel | $V_{meso}$ (mL/g) | $V_{macro}$ (mL/g) | $D_{pmeso}$ (nm) | $D_{pmacro}$ (nm) | TPV (mL/g) | $S_{BET}$ (m²/g) |
|---|---|---|---|---|---|---|---|
| A1 (in accordance with the invention) | 27 g/L | 0.83 | 0.21 | 20.8 | 250 | 1.04 | 130 |
| C2 (comparative) | 60 g/L | 0.58 | 0.22 | 15.3 | 350 | 0.80 | 135 |
| C1 (comparative) | 40 g/L | 0.70 | 0.11 | 16.5 | 750 | 0.86 | 137 |
| C3 (comparative) | 8 g/l | 0.80 | 0.00 | 19.2 | — | 0.80 | 160 |

Dissolving Step a):

156 mL of aluminium sulphate was introduced all at once into the reactor containing the foot of water. The change in the pH, which remained in the range 2.5 to 3, was monitored for 10 min. This step contributed to introducing 2.1% by weight of alumina with respect to the total mass of alumina formed at the end of synthesis of the gel.

Step b), Adjustment of pH:

After the step for dissolving the aluminium sulphate, approximately 156 mL of sodium aluminate was then slowly added. The aim was to obtain a pH in the range 7 to 10 over a period of 5 to 15 min.

Co-precipitation Step c):

The following were added to the suspension obtained in step b) over 30 min:

When the final alumina concentration of the suspension of alumina gel obtained at the end of step c) is more than 38 g/L (aluminas C1 and C2), it can be seen that the desired pore characteristics are not obtained, in particular a median mesopore diameter of less than 18 nm. Further, the mesopore volume plateaus at 0.70 mL/g.

When the final alumina concentration of the suspension of alumina gel obtained in step c) is less than 10% (alumina C3), no notable macroporosity is obtained ($V_{macro}$=0.0 mL/g), and the alumina obtained is exclusively mesoporous.

The invention claimed is:

1. A process for the preparation of an amorphous mesoporous and macroporous alumina, said process comprising at least:

a) dissolving an acidic precursor of aluminium that is aluminium sulphate, aluminium chloride or aluminium nitrate in water, at a temperature of 20° C. to 90° C., at a pH of 0.5 to 5, for a period of 2 to 60 minutes;

adjusting the pH to 7 to 10 by adding, to the suspension obtained in a), a solution consisting of at least one basic precursor, at a temperature of 20° C. to 90° C. and for a period of 5 to 30 minutes, which basic precursor is at least one of sodium aluminate, potassium aluminate, ammonia, sodium hydroxide or potassium hydroxide;

c) co-precipitation of the suspension obtained at the end of b) by adding to the suspension at least one basic precursor that is sodium aluminate, potassium aluminate, ammonia, sodium hydroxide or potassium hydroxide and at least one acidic precursor that is aluminium sulfate, aluminium chloride, aluminium nitrate, sulphuric acid, hydrochloric acid or nitric acid, at least one of the basic or acidic precursors comprising aluminium, the relative flow rate of the acidic and basic precursors being selected so as to obtain a pH of 7 to 10 in the reaction medium and the flow rate of the acidic and basic precursor or precursors containing aluminium being adjusted so as to obtain a final concentration of alumina in the suspension of 10 to 38 g/L;

d) filtration of the suspension obtained at the end of the co-precipitation c) in order to obtain an alumina gel;

e) drying said alumina gel obtained in d) in order to obtain a powder;

f) shaping the powder obtained at the end of e) in order to obtain a green material;

g) heat treatment of the green material obtained at the end of f) at a temperature of 500° C. to 1000° C., optionally in the presence of a stream of air containing up to 60% by volume of water, wherein an alumina having 10% to 35% by volume of macropores based on total pore volume is produced.

2. The process according to claim 1, in which the concentration of alumina in the suspension of alumina gel obtained in c) is 13 to 35 g/L.

3. The process according to claim 2, in which the concentration of alumina in the suspension of alumina gel obtained in c) is 15 to 33 g/L.

4. The process according to claim 1, in which the acidic precursor is aluminium sulfate.

5. The process according to claim 1, in which the basic precursor is sodium aluminate.

6. The process according to claim 1, in which in a), b), and c), the aqueous reaction medium is water and reaction is carried out with stirring, in the absence of an organic additive.

7. The process according to claim 1, in which the acidic precursor of a) is introduced in a quantity corresponding to 0.5% to 4% of the total weight of the alumina formed at the end of c).

* * * * *